(12) United States Patent
Ambs

(10) Patent No.: US 12,000,674 B1
(45) Date of Patent: Jun. 4, 2024

(54) HANDHELD INTEGRATED TARGETING SYSTEM (HITS)

(71) Applicant: Loran Ambs, Arlington, VA (US)

(72) Inventor: Loran Ambs, Arlington, VA (US)

( * ) Notice: Subject to any disclaimer, the term of this patent is extended or adjusted under 35 U.S.C. 154(b) by 0 days.

(21) Appl. No.: 16/602,648

(22) Filed: Nov. 18, 2019

(51) Int. Cl.
*F41G 3/06* (2006.01)
*F41G 9/00* (2006.01)
*G01S 13/72* (2006.01)
*G01S 13/86* (2006.01)

(52) U.S. Cl.
CPC .............. *F41G 3/06* (2013.01); *F41G 9/00* (2013.01); *G01S 13/723* (2013.01); *G01S 13/86* (2013.01)

(58) Field of Classification Search
CPC . F41H 11/02; F41H 11/00; F41H 3/00; F41H 13/00; F41G 7/30; F41G 7/007; F41G 7/008; F41G 5/08; F41G 7/306; F41G 7/308; F41G 7/224; F41G 3/06; F41G 1/38; F41G 3/00; F41G 11/00; F41G 7/28; F41G 3/02; F41G 3/142; F41G 3/165; F41G 5/14; F41G 3/14; F41G 3/26; F41G 3/265; F41G 7/303; F41G 9/00; F41G 7/00; F41G 7/20; F41G 7/2293; F41G 7/2233; F41G 7/2206; F41G 7/2286; F41G 7/226; F41G 7/2226; G01S 13/723; G01S 13/726; G01S 7/415; G01S 13/003; G01S 13/66; G01S 13/86; G01S 13/867; G01S 13/878; G01S 7/36; G01S 13/00; G01S 13/87; G01S 13/50; G01S 13/582; G01S 13/883; G01S 13/72; G01S 13/426; G01S 7/295; G01S 7/4017; G01S 7/40; G01S 13/931; G01S 7/03; G01S 7/35; F42B 15/01; G05D 1/12; G05D 1/107

See application file for complete search history.

(56) References Cited

U.S. PATENT DOCUMENTS

| | | | | |
|---|---|---|---|---|
| 4,925,129 A | * | 5/1990 | Salkeld | F41G 7/2293 244/3.14 |
| 6,527,222 B1 | * | 3/2003 | Redano | F41G 7/30 342/195 |
| 7,473,876 B1 | * | 1/2009 | Pedersen | F41G 7/30 342/61 |
| 7,511,252 B1 | * | 3/2009 | Pedersen | F41G 7/30 342/61 |
| 7,663,528 B1 | * | 2/2010 | Malakian | G01S 13/723 342/13 |
| 8,138,965 B1 | * | 3/2012 | Luu | G01S 13/723 342/90 |
| 8,924,325 B1 | * | 12/2014 | Schuck | G06N 5/046 706/45 |
| 9,151,572 B1 | * | 10/2015 | Sieracki | F41G 3/18 |
| 9,250,043 B1 | * | 2/2016 | Block | F41G 7/306 |

(Continued)

FOREIGN PATENT DOCUMENTS

| | | | | |
|---|---|---|---|---|
| WO | WO-2010028759 A1 | * | 3/2010 | F42B 21/00 |
| WO | WO-2018213575 A1 | * | 11/2018 | G05D 1/102 |

*Primary Examiner* — Olumide Ajibade Akonai

(57) ABSTRACT

An aiming system for handheld weapons that includes a target detection and tracking system; an IMU integrated with the target detection and tracking system, weapon launching system; an IMU integrated with the weapon launching system, a fire control computer and a display system enabling the weapons launcher operator to point the weapon with the appropriate elevation and azimuth for the weapon projectile to intercept the intended target.

20 Claims, 2 Drawing Sheets

(56) References Cited

U.S. PATENT DOCUMENTS

| | | |
|---|---|---|
| 9,551,552 B2 * | 1/2017 | Kolanek |
| 10,041,774 B2 * | 8/2018 | Bucklaew ................ G05D 1/12 |
| 11,740,055 B1 * | 8/2023 | Choiniere ............. F41G 7/2253 |
| | | 701/2 |
| 2006/0238403 A1 * | 10/2006 | Golan .................... F41G 7/303 |
| | | 342/62 |
| 2016/0216072 A1 * | 7/2016 | McNeil ................... F41G 3/165 |
| 2017/0160056 A1 * | 6/2017 | Sullivan ................. F41G 3/165 |
| 2017/0227328 A1 * | 8/2017 | Newzella ................ F41G 1/48 |

* cited by examiner

HANDHELD INTEGRATED TARGETING SYSTEM (HITS)

CROSS-REFERENCE TO RELATED APPLICATIONS

None

FEDERALLY SPONSORED RESEARCH

None

BACKGROUND

Field of the Invention

The invention is related to the general field of integrated targeting systems for handheld weapons. Specifically, Handheld Integrated Targeting Systems (HITS) is an aiming system that enables operators of handheld ballistic weapons systems to point their weapon with the correct elevation and azimuth to have their kinetic rounds intercept the intended target.

Description of the Related Art

Soldiers, law enforcement and border-security personnel are often threatened by Unmanned Aircraft Systems (UASs), also referred to as "Drones." The ability to engage UAS threats with handheld weapons is limited by the skill of the weapons operator to accurately compensate for the ballistic characteristics of the weapon being used, (i.e., raising the elevation of the weapon to compensate for the drop of the projectile in transit to the target) and the flight characteristics of the target (e.g., altitude, speed, direction of travel, rate of turn). What is needed is a system to compute a firing solution for the operator (e.g., elevation and azimuth) that takes into account weapon and target characteristics and also provide a pointing aide for the operator to accurately point the weapon so that counter-measure projectiles are highly likely to intersect the path of the target. HITS provide a target detection and tracking system coupled with a fire control solution computer and pointing aide. The following patents from the related arts are discussed as follows.

U.S. Pat. No. 5,379,676; Fire control system.

This patent of the related art is a fire control system. The fire control system comprises a manually aimed gun having a sighting device and a device for acquiring a target. The acquiring device is disposed at a location remote from the gun. The fire control system also comprises a device for providing information relating to the target to the sighting device of the gun such that an operator of the gun can aim the gun with respect to the sighting device. The providing device is in communication with the acquiring device and the sighting device. The present invention is also a fire control method for a minor caliber gun. The method comprises the step of acquiring a target from a location which is remote from the gun. Next, there is the step of providing information relating to the target to a sighting device of the gun. Then, there is the step of manually aiming the gun in accordance with the information appearing on the sighting device.

U.S. Pat. No. 7,239,976; This patent of the related art is a method and system for automatic pointing stabilization and aiming control device (CROWS: Common remotely operated weapon station).

A platform-residing viewing sensor and a pointing system/weapon. A system operator is remotely monitoring the scene on a display as viewed by the viewing sensor such that a system operator can gaze, acquire and track targets by scanning the scene with eyes and locking the eyesight onto a selected target and track the target with the eyes. The system further includes a dual camera sensor that follows and monitors the system operator's eye motion so that the system operator can simultaneously monitor the external viewing sensor's scene, locking and tracking some selected target. The display coordinates of the selected target are utilized to point the pointing system/weapon on the external platform so that the system operator can fire at the target as desired. The problem is thus summarized as one of controlling the weapon pointing, movement and firing on a target that has been selected and is tracked by the eyes of a system operator viewing a display. This patent requires human operator to view scene, detect, track and select the target. This patent additionally generates servo motor controls to slew the turret.

U.S. Pat. No. 9,823,048; Ballistic effect compensating reticle and aim compensation method.

This patent of the related art is directed to a ballistic effect compensating reticle (e.g., 200 or 300) and aim compensation method for rifle sights or projectile weapon aiming systems includes a multiple point elevation and windage aim point field (e.g., 150 or 350) including a primary aiming mark (e.g., 158 or 358) indicating a primary aiming point configured to be sighted-in at a first selected range and a plurality of secondary aiming points arrayed beneath the primary aiming mark. The method for compensating for a projectile's ballistic behavior while developing a field expedient firing solution permits the shooter to express the field expedient firing solution in units of distance, (e.g., yards or meters, when describing or estimating range and nominal air density ballistic characteristics), and velocity (e.g., mph or kph, for windage hold points).

U.S. Pat. No. 4,695,161; Automatic ranging gun sight.

This patent of the related art is directed to an auto-ranging sight includes an optical viewer that includes a reticle within the viewer. The reticle is a liquid crystal display having a plurality of horizontal lines which can individually be selected to be visible. A distance measuring device is provided for measuring distance from the sight to a target. Parameter information is input to a microprocessor to describe the flight of a projectile. The microprocessor also receives the distance information. The microprocessor then determines the required elevation for the optical viewer and attached weapon. It then selects one of the horizontal lines as the visible horizontal crosshair. The operator then aligns the horizontal and vertical crosshairs seen through the viewer such that the projectile can be accurately directed to the target. Optionally, a group of liquid crystal display vertical lines can be provided to accommodate windage adjustment for aiming the target. The range determination can be provided by systems using radar, laser, ultrasonic or infrared signals.

U.S. Pat. No. 7,171,776; Weapon sight having analog on-target indicators.

This patent of the related art is directed to a device that has structure that can support the device on a weapon, and a range portion that specifies a range to a target. A sensor portion provides sensor information representing an orientation of the device, and an electronic control portion is responsive to sensor information from the sensor portion and a range from the range portion for calculating how to hit the target with a munition. The device includes a sight that facilitates weapon orientation in preparation to fire the munition, the sight having an analog indicator that is disposed within its field of view and that is responsive to the electronic control portion for indicating how to orient the weapon so that the munition will hit the target.

U.S. Pat. No. 8,051,597; Scout sniper observation scope.

This patent of the related art is directed to a method and system for an observation system for use in weapon aiming is disclosed. An observation scope displays azimuth and elevation adjustments. Meteorological information is gathered by one or more weather stations, which use weather sensors. A range finder determines a distance between the observation scope and a target. A ballistics processor determines a ballistic solution based on the distance and the meteorological information. The ballistic solution is provided to the observation scope. With on-ground weapon platforms the gunner may establish a "hold' for static targets or "lead for moving targets." These techniques permit shooters to hit their intended targets with a high degree of accuracy.

SUMMARY OF THE INVENTION

In a preferred exemplary embodiment of the HITS system, a firing solution is computed using ballistic characteristics of the weapon; a radar system that provides range, locations and kinematic tracking characteristics of the intended target; and location information of the radar system and the weapon system. Once the fire control solution is generated, a visual display is generated for the operator to point the weapon to the indicated location that results in projectile and target intersection.

By way of an example application of the HITS, Applicant describes its application using the M320 grenade launcher. This is a weapon system currently in the Army inventory and with implementation of HITS, it could effectively engage a UAS threat. There are a number of munitions that have been manufactured for use with the M320 system. The maximum effective range of the M320 system is 400 m; some projectiles are less than that. Existing rounds include high-explosive and fragmentation variants with kill radius of personnel of 5 m. The MK285 round is a Programmable Pre-fragmented High Explosive/Self-Destructible (PPHE/SD) munition that has an electronic programmable fuse. This round would be particularly relevant to the C-UAS application. The amount of fuse delay is electronically programmed by electronics built into the M320 grenade launcher and MK285 prior to launch.

An exemplary embodiment provides an aiming system for handheld weapons that include a target detection and tracking system; the aiming system including: a radar system; a target range, location, and tracking kinematics system in communication with the radar system; a weapon launcher configured for use by a weapons launcher operator; an inertial measurement unit integrated with the weapon launching system, a fire control computer and a weapon launcher aiming aide display system in communication with the weapon launcher; and the weapon launcher aiming aide display system enabling the weapons launcher operator to point the weapon with the appropriate elevation and azimuth for the weapon projectile to intercept the intended target.

LIST OF REFERENCE NUMERALS FOUND IN THE DRAWINGS

Figure 1:
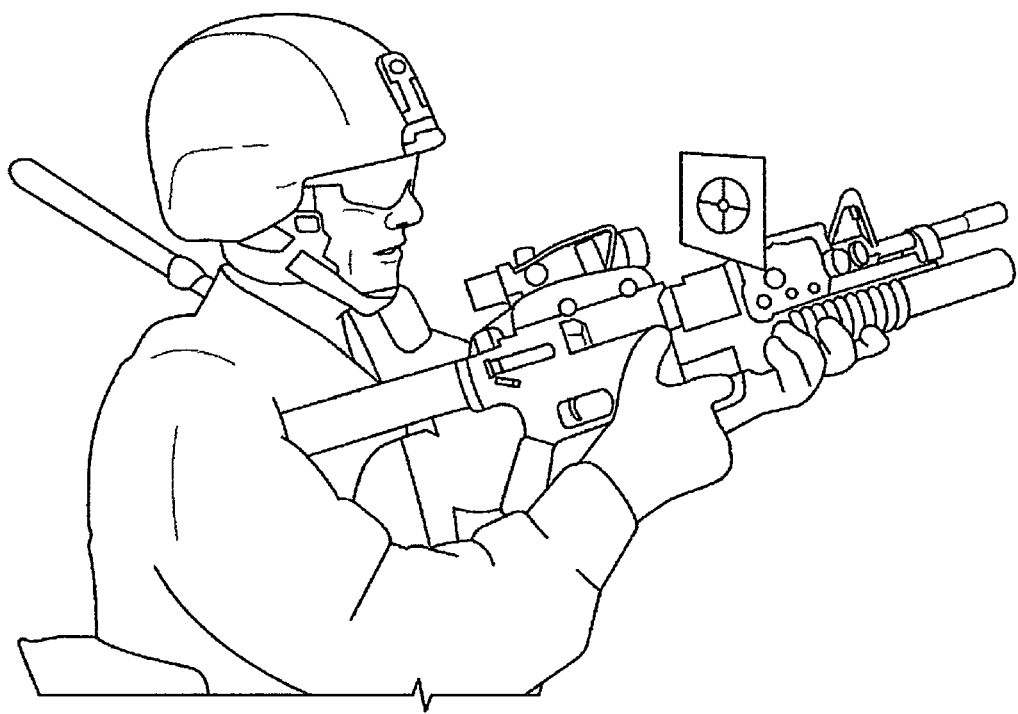
FIG. 1 represents a weapon fitted with the handheld integrated targeting weapon.

Item 100 represents an operator with a handheld integrated targeting system.
Item 200 represents a flowchart of a handheld integrated targeting system.
Item 210 represents a radar system.
Item 220 represents a radar data processor.
Item 230 represents a fire control computer.
Item 240 represents a weapon launcher aiming aid display.
Item 250 represents a weapon launcher operator.
Item 260 represents a weapon launcher.
Item 270 represents a munition programmer.
Item 280 represents munition.
Item 290 represents the target.
Item 300 represents an IMU radar system.
Item 310 represents a radar system location, target range, location and radar track kinematics.
Item 320 represents an IMU weapon system.
Item 330 represents a weapon launcher, location and launcher track kinematics.

DETAILED DESCRIPTION OF EXEMPLARY EMBODIMENTS OF THE INVENTION

In an exemplary embodiment, the radar system (210) and weapon launcher sub systems (260) of HITS (200) are integrated with GPS-Aided Inertial Measurement Unit (GPS/IMU) (320) within weapons Launcher sub systems (260) to provide location of the subsystems and data on the motion of the subsystems in the form of track kinematics (310). Radar Data Processor (220) communicates with radar system (210), IMU radar system (300) and represents a radar system location, target range, location and radar track kinematics (310). The weapon launching subsystem (260) is also integrated with devices such as an inclinometer and/or an Attitude Heading Reference System (AHRS) to provide information on the orientation (e.g., roll, pitch and yaw), velocity, acceleration and rates of change of tilt or rotation of the weapon launcher 260 subsystem. Examples of such devices are:

VectorNav VN-200: a miniature, high performance GPS-Aided Inertial Navigation System (GPS/INS) that combines MEMS inertial sensors, a high-sensitivity GPS receiver, and advanced Kalman filtering algorithms to provide optimal estimates of position, velocity and attitude.

VectorNav VN-100: a Gyro-Stabilized Inclinometer also known as a tilt meter, tilt indicator, pitch & roll sensor, level meter and gradiometer. Tilt sensors and inclinometers generate an artificial horizon and measure angular tilt with respect to the horizon. They are used in a wide variety of industrial systems including platform leveling, aircraft flight controls, antenna tracking and many other applications that require tilt measurements.

Attitude Heading and Reference System: a 3-axis Inertial Measurement Unit (IMU) combined with a 3-axis magnetic sensor, and an onboard processor that creates a virtual 3-axis sensor capable of measuring heading (yaw), pitch, and roll angles of an object moving in 3D space. An onboard Kalman filter is used to compute the orientation solution using these various measurements.

Some AHRS sensors will also use GPS to help stabilize the gyro drift and provide a more accurate estimate of the inertial acceleration vector.

For the sake of simplicity, Applicant refers to the several system components that provide location, tilt, velocity and rates of changes of those measurements by the generic term IMU.

Figure 2:
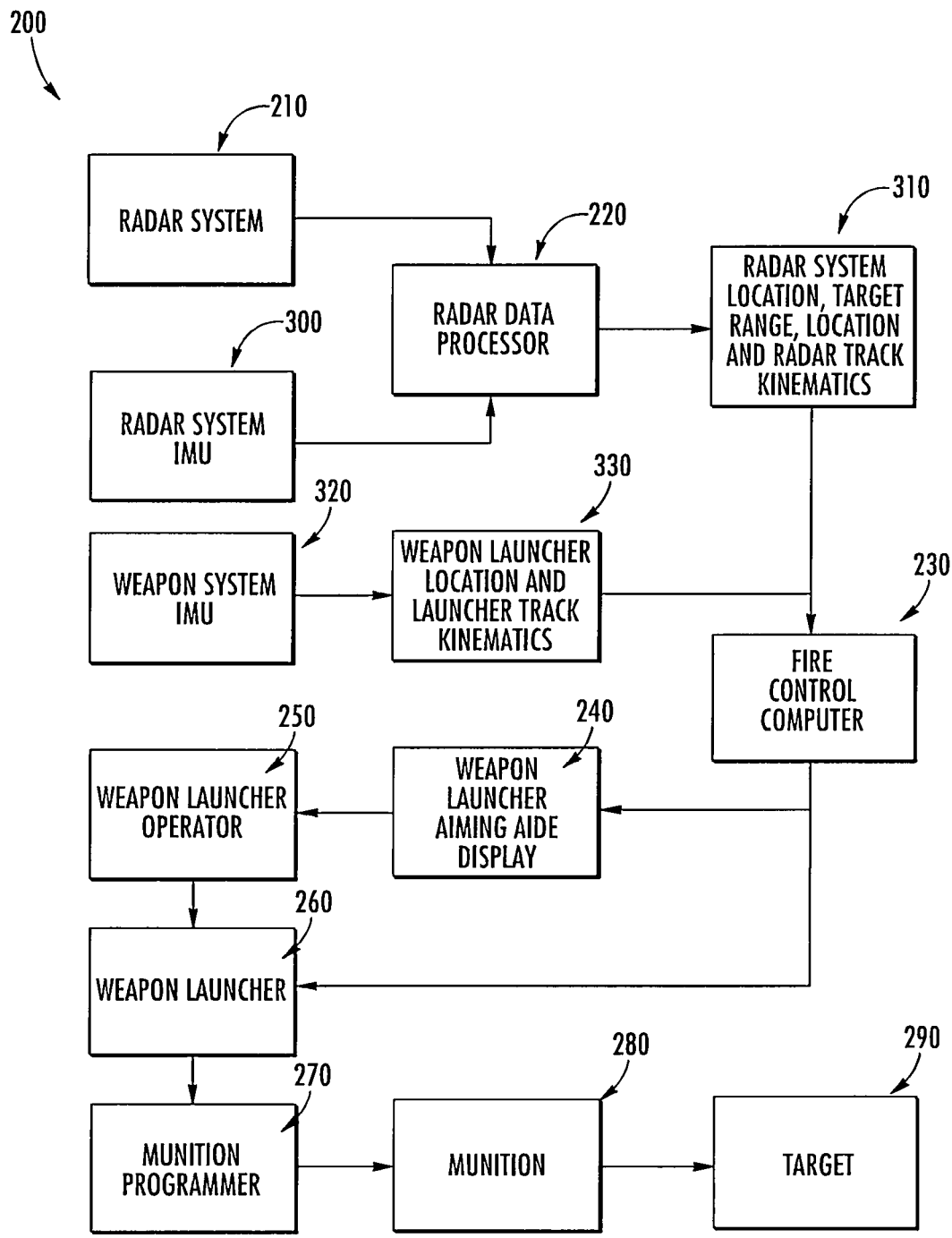
FIG. 2 represents a flowchart of a handheld integrated targeting weapon system.

With data provided by the radar system data processor 220 on the location of the target UAS 290, combined with the motion characteristics of the target, motion characteristics of the radar 210 and the weapon launcher subsystems 240 and the flight characteristics of the C-UAS munition 280, a fire control solution through fire control 230 is developed for the elevation and azimuth of the weapons launcher 260 to direct a C-UAS munition fired from the weapons launcher 260 to intercept the threat UAS target 290. Information on target 290 and radar system 210 location and kinematic track 310 is communicated to one or more weapon launch systems 260 by hardwire, RF, optical or other communication system for computation of the fire control solution of fire control computer 230 at the weapon launcher aiming aide 240. Alternatively, the location and motion characteristics of the one or more weapon launcher systems 330 could be communicated to the fire control computer 230, by hardwire, RF, optical or other communication system for computation of the fire control solution. Detection and tracking system 330 are used with IMU weapons system 320, as shown in FIG. 2. Weapon Launcher aiming aide display 240 outputs to a weapon Launcher operator at 250 and outputs from weapons launcher 260 to munitions programmer 270. Munition programmer 270 outputs to munition system 280. The final operation is output from munition 280 to target 290, where the launched munition destroys the target.

Because there is more than one UAS threat with various levels of risks and probability of inflicting damage to personnel or facilities, and there is more than one weapon launcher to engage the UAS threat(s) at differing locations and differing resources, there is merit to coordinate firing solutions at a centralized location to optimize response to the UAS threat(s). Computation of the one or more fire control solutions at a centralized location such as the radar detection and tracking subsystem has the advantage of improved situational awareness leading to automated prioritization of target engagement (e.g., based on proximity, severity of threat, location and types of munitions available to the one or more weapon launchers).

Currently, the operator (100) of a M320 grenade launcher is required to estimate the range of the target, adjust the iron sights to account for the fall of the munition after launch. If the range to target is not correctly estimated, the munition will pass the target too high or too low. If the target is in motion, the operator will need to estimate the appropriate lead angle to intersect with the location of the target when the munition arrives at that distance. A radar-based range and motion-compensated fire control solution takes all the guess-work out of the pointing the weapon launcher.

Implementing the firing solution for handheld, operator-aimed weapons launchers is accomplished by the integrated weapon launcher IMU and a very simple display that guides the launcher operator to elevate the launcher to the angle computed by the fire control solution of fire control computer (230) and slew the launcher (260) to the appropriate azimuth that is most likely to have the launched munition (280) intercept the threat target (290). This is accomplished by a small display rigidly affixed to the picatinny rail of the launcher (260). The orientation of the weapon launcher aiming aide display (240) need not be calibrated with the orientation of the weapon launcher (260), but the IMU must be calibrated with respect to azimuth and elevation. In one exemplary embodiment of the HITS, the weapon launcher aiming aide display (240) illustrates a set of crosshairs and a red dot, as shown in FIG. 1. The red dot moves on the display (240) according to how well the launcher is pointed to the correct elevation and azimuth of the fire control solution of the fire control computer (230). If the weapon is elevated too low, the red dot will be below the horizontal line of the crosshairs and the operator will see that the weapon needs to be elevated and further raise the red dot. Likewise, if the weapon is pointed too far to the right, the red dot will be to the right of a vertical line indicating proper azimuth alignment. The operator (100) drives the red dot to be centered at the crosshairs. The fire control solution of the fire control computer (230) is continuously updated and the operator continuously drives the red dot to the crosshairs until the munition (280) is launched toward the target (290). Other methods for pointing the weapon to implement the fire control solution of the fire control computer (230) accomplish the same results. In the preferred embodiment, the HITS display can be projected onto Night Optical/observation Devices (NODs) or Family of Weapon Sight-Individual, (FWS-I), as would be understood by one of ordinary skill in the art.

In another exemplary embodiment, the target detection and tracking subsystems (310) is integrated with or in communication with the IMU weapon (320). The data processing hardware and software subsystems such as the Radar Data Processor (220) used to detect and track potential targets and the Fire Control Computer of the fire control computer (230) is mechanically and/or electronically integrated with the weapon and communicate with the on-board or off-board Weapon Launcher Aiming Aide Display (240). Communication between the detection and tracking system (310) is accomplished by one or more communication techniques, as would be understood by one of ordinary skill in the art. In a preferred exemplary embodiment of the HITS, command signals, system status and data exchanged between the Radar System (210) and the Radar Data Processor (220) will be accomplished by hardwire links.

Communication is accomplished by wireless means such as RF, electro-optical, infrared, or acoustics implemented into the various systems and subsystems. Lacking specific information on the kinematic characteristics of the weapon system and/or target, default values are employed in computing the firing solution. In the event that flight characteristics of a target (290) or ballistic countermeasure are not precisely known or deduced from sensor observations, the weapon operator (250) may instruct the system (200) to use values of similar countermeasures or targets (290) so that a fire control solution (230) can be computed. Operator selected flight characteristics of countermeasures and/or targets (290) is overridden.

In addition to the use of the radar system (210), the HITS system may exploit data (220) from one or more other sensor modalities used to detect, locate, track and classify potential targets (290). Sensor modalities may include active, passive and noise radars using monostatic and bi-static TX and RX arrays, active and passive optical systems, infrared, passive RF direction finding by exploiting target (290) communication links and unintended RF emissions of the target or active and passive acoustic methods to include underwater acoustics. Having the ability to select between one or more sensor modalities enables the operator to select the modality most favorable to collection circumstances while minimizing the detection signature of the HITS. Use of multiple UAS detection modalities increases the probability of detecting, tracking and correctly classifying the target UAS while minimizing false alarm rate.

The sensor system is co-located with the weapon system (320) or separated from the weapon system (320). The sensor subsystem such as the Radar System transmitter and/or receiver (210) is mechanically and/or electronically integrated with the weapon (260) and hence, collocated with the weapon (260). A fire control solution (230) is computed for weapon systems at a location different than that of the sensor system. For instance, a HITS sensor computes fire control solutions using a fire control computer (230) for multiple weapon system separated from the sensor subsystem. The HITS selectively assigns a fire control solution using the fire control computer (230) to the weapon system (260) most likely to successfully engage the target UAS (290) because of weapon characteristics or advantageous position.

The fire control solution of the fire control computer (230) is computed by the sensor system and transmitted to the HITS aiming display. In system configurations in which the Fire Control Computer (230) is separated from the Weapon Launcher Aiming Aide Display (240), the fire control solution is transmitted to Weapon Launcher Aiming Aide Display (240) by hardwire link or wireless means such as RF, electro-optical, infrared, or acoustic communications.

Data from the Radar Data Processor (220), such as the Radar System Location, Target Range, Location and Radar Track Kinematics (310) is processed by a remotely located Fire Control Computer (230). Radar data such as (310) is processed to create a fire control solution by computing resources integrated with other HITS subsystems such as the Weapon Launcher Aiming Aide Display (240). Radar data 310 is transmitted to a remotely located computing resource by hardwire or wireless means such as RF, electro-optical, infrared, or acoustic means.

Target detection and tracking system is accomplished by employment of a plurality of sensor modalities such as radar, electro-optic (e.g., visible, Near IR, Shortwave IR), laser, and acoustic communications. Sensor modalities are employed synchronously or asynchronously. Multiple fire control solutions of the fire control computer (230) is computed for each of several modalities and consolidated after processing into a single fire control solution to be used for engaging a threat target (290).

Alternatively, multi-modal sensor data collected synchronously is combined to yield a single data set for computing a fire control solution. Multi-modal sensor inputs have the advantage of:
  i. improving the probability of detection, localization accuracy, maintaining accuracy and reliability of target tracks, and classifying targets;
  ii. Enabling the HITS to operate in the broadest range of physical and operational environments;
  iii. Reduced sensitivity to failure of any one sensor modality, and
  iv. enabling the operator to select sensor configurations resulting in a signature least observable by potential adversaries.

Providing an estimate of range to target (290), HITS may deduce target kinematic track properties from weapon-mounted IMU data resulting from the weapon launch operator (250) using the weapon optical sights to manually track the threat target (290) to produce elevation rate and azimuth rate changes to compute fire control solution with elevation pitch and lead angle.

HITS is used in conjunction with kinetic (e.g., bullets, grenades, missiles, nets) and non-kinetic weapon systems such as directed energy weapons (e.g., lasers, electronic warfare, acoustic). Weapon systems are characterized as surface-to-surface, surface-to-air, underwater.

A single Fire Control Computer (230) computes fire control solutions for one or more than one weapon system spatially separated from the Fire Control Computer (230). Provided with information (330) from weapon systems (320) remotely located from the Fire Control Computer (230), Fire Control Computer (230) is able compute a fire control solution for that weapon (260). Weapon data (330 of FIG. 2) and fire control solution is exchanged between the Weapon System IMU (320), Fire Control Computer (230) and the Weapon Launcher Aiming Aide Display (240) by hardwire or wireless means such as RF, electro-optical, infrared or acoustic means.

The fire control solution is provided to an unmanned automated weapons station to engage the target (290) when weapon system data (330) and radar data 310 are provided to the Fire Control Computer (230). Communication channels for exchanging data between the unmanned weapon system are the same as for manned systems.

The fire control solutions are computed simultaneously for multiple targets (290). Automated target prioritization for engagement is available to engage the threat based on the characteristics of the weapons available and rules of engagement. HITS may selectively provide a firing solution only to the weapon system most appropriate for engagement.

The fire control solutions are updated continuously to keep abreast of ever-changing kinematic behavior of targets, sensors and weapons. Continuous updates also facilitate multiple engagements of the one or more targets by the one or more weapon systems.

The Weapon Launcher Aiming Aide Display (240) is separated from the weapon provided the weapon is appropriately instrumented with Weapon System IMU (320) to indicate the elevation and azimuth of the Weapon. The Weapon Launcher Aiming Aide Display (240) is integrated with a body-worn display system such as a smart watch, Night Vision Goggles or Family of Weapon Sight-Individual displays. Similarly, the Weapon Launcher Aiming Aide Display is hosted on a smart phone, laptop, desktop computer, or other device convenient to the operator.

The C-UAS munition is equipped with control surfaces or other means of changing flight direction, the HITS may communicate course corrections to the munition (280) based on updates to threat track kinematics to improve the probability of intercept. HITS may also communicate the time or location for detonating the munition based on target track kinematics.

The Weapon Launcher Aiming Aide Display (240) places a "meatball" i.e., the red dot, in the crosshairs of a stand-alone weapon-mounted display or integrated with multi-purpose weapon sighting display (240). Meatball offset from the intersection of crosshairs is linear, logarithmic or exponential. For instance, the meatball at the left edge of the display indicates that the weapon is mis-aligned by −90° in azimuth from the orientation needed to achieve the computed fire-control solution.

HITS computes fire control or intercept solutions for maimed and unmanned countermeasures. C-UAS countermeasures may include bullets, explosive devices, fragmentation devices, combinations of explosive and fragmentation device, entanglement and capture devices, directed energy devices, electromagnetic beam or pulse, or electronic attack devices.

HITS is integrated with robotic companions providing power and/or computing resources enabling HITS functionality. Robotic platforms are equipped with Weapon System IMU (320) and weapons integrated with electro-mechanical components to implement the fire control solution.

HITS may communicate track kinematic data to one or more remote weapons systems such as anti-aircraft systems or counter-fire battery to engage targets or engage threat launching facilities.

Meteorological variables such as temperature, humidity and wind direction and velocity are provided to HITS to improve accuracy of the fire control solution.

HITS is also applicable to any weapon system requiring accurate orientation for effectiveness. These include hand-held guns, crew-served weapons, automated weapon stations, mortar tubes, rocket propelled grenade, rockets, etc. HITS functionality is applicable to terrestrial, maritime and air systems. When not being carried by an operator, HITS system components are used as a conventional ground-based system. Additionally, HITS is used to compute fire control solutions for targets moving at ground level, on the surface of the ocean or underwater.

Although exemplary embodiments have been shown and described, other exemplary embodiments would be understood by those of ordinary skill in the art. The invention is not limited to the exemplary embodiments disclosed, but rather by the scope of the appended claims.

What is claimed is:

1. A weapon aiming system configured to direct a target countermeasure to a target, the weapon aiming system comprising:
    at least one target sensor configured to detect and compute location and tracking information of the target in three-dimensional space;
    at least one weapon launcher including a countermeasure aiming aide, the weapon launcher configured to launch the countermeasure under control of a weapon launcher operator;
    a tracking kinematics system configured to compute target kinematic data of the target and compute target countermeasure kinematic data of the target countermeasure in the weapon launcher;
    an inertial measurement unit integrated with the weapon launcher configured to determine an elevation and azimuth orientation of the weapon launcher with respect to a launch direction of the target countermeasure;
  a fire control computer configured to compute a fire control solution for the determined elevation and azimuth orientation of the weapon launcher based on the location and motion characteristics of the radar, the location and motion characteristics of the target, the location and motion characteristics of the weapon launcher, and flight characteristics of the target countermeasure;
    wherein the countermeasure aiming aide is configured to display, based on the computed firing solution,
      a first symbol at a fixed point, the first symbol indicating a correct orientation of the weapon launcher to implement the fire control solution, and
      a second symbol positioned relative to the first symbol, the second symbol indicating a magnitude and a direction of a correction necessary to orient the weapon launcher to implement the computed fire control solution.

2. The weapon aiming system of claim 1, wherein said target sensor may be collocated with said weapon launcher.

3. The weapon aiming system of claim 1, wherein said target sensor may be spatially separated from said weapon launcher.

4. The weapon aiming system of claim 1, wherein the target sensor may include at least one of a radar, a radio frequency transceiver, an electro-optic device, a laser, or an acoustic transceiver.

5. The weapon aiming system of claim 4, wherein target sensor comprises a plurality of target sensors employed one of synchronously or asynchronously.

6. The weapon aiming system of claim 5, wherein observations from said plurality of target sensors collected synchronously from said plurality of target sensors is combined to yield a single data set for computing said fire control solution.

7. The weapon aiming system of claim 1, wherein the weapon aiming system further includes at least one of a surface-to-surface countermeasure system, a surface-to-air countermeasure system, an air-to-air countermeasure system, an air-to-surface countermeasure system, and an underwater countermeasure system.

8. The weapon aiming system of claim 1, wherein
    said weapon launcher is an unmanned automated weapon; and
    the determined elevation and azimuth orientation of the fire control solution is implemented by the unmanned automated weapon.

9. The weapon aiming system of claim 1, wherein the weapon launcher operation includes a robotic companion configured to provide power, computing and operational resources.

10. The weapon aiming system of claim 1, wherein:
    the fire control solution is computed simultaneously for each of a plurality of targets;
    an order of engaging each of the plurality of targets is automated by the fire control computer based on a threat level posed by each of the plurality of targets; and
    the fire control computer automates assignment of one or more of the plurality of weapon launchers available to engage each of the plurality of targets based on the characteristics of the targets and countermeasures including:
      at least one of kinematic, physical Q threat characteristics of the plurality of targets;
      at least one of a location, a readiness level and a ballistic characteristics of the weapon launcher and the target countermeasure;
      at least one of a type and a characteristic of the target countermeasure; and
      at least one rule of engagement.

11. The weapon aiming system of claim 1, wherein the fire control solution is continuously updated based on a change in at least one of a kinematic behavior of the target, the at least one sensor and the weapon launcher.

12. The weapon aiming system of claim 1, wherein the target countermeasure further includes at least one control surface configured to provide a change in direction of the target countermeasure during flight based on receiving updates to the target track kinematics of the target countermeasure; and
    wherein the weapon aiming system is further configured to communicate a time or g location for detonating said target countermeasure based on, the target kinematic data of the target.

13. The weapon aiming system of claim 1, wherein said fire control solution for the weapon launcher is configured to launch target countermeasures including at least one of a bullet, an explosive device, a fragmentation device, a combination of an explosive and a fragmentation device, an entanglement and capture device, a directed energy device, an electromagnetic beam or pulse electronic attack device.

14. The weapon aiming system of claim 1, further comprising the weapon aiming system further configured to communicate the target kinematic data to one or more remote weapons systems including at least one of an anti-aircraft systems or a counter-fire battery.

15. The weapon aiming system of claim 1, wherein
meteorological variables including one or more of temperature, humidity, wind direction and velocity are input to the fire control computer to computer the fire control solution.

16. The weapon aiming system of claim 1, wherein said weapon launcher aiming aide comprises a body-worn display system including at least one of a smart watch, night vision goggles or a weapon sight-individual display.

17. The weapon aiming system of claim 1, wherein data between the target sensor, the fire control computer, the weapon launcher, the target countermeasure, the weapon launcher inertial measurement unit is exchanged over a data exchange network enabled by one or more communication means including hardwire, wireless, radio frequency, electro-optical, infrared, and acoustic.

18. A weapon aiming system configured to direct a target countermeasure to a target, the weapon aiming system comprising:
   at least one target sensor configured to detect and compute location and tracking information of the target in three-dimensional space;
   at least one weapon launcher configured to launch the countermeasure under control of a weapon launcher operator;
   at least one countermeasure aiming aide spatially separated from the weapon launcher;
   a tracking kinematics system configured to compute target kinematic data of the target and compute target countermeasure kinematic data of the target countermeasure in the weapon launcher;
   an inertial measurement unit integrated with the weapon launcher configured to determine an elevation and azimuth orientation of the weapon launcher with respect to a launch direction of the target countermeasure;
   a fire control computer configured to compute a fire control solution for the determined elevation and azimuth orientation of the weapon launcher based on the location and motion characteristics of the radar, the location and motion characteristics of the target, the location and motion characteristics of the weapon launcher, and flight characteristics of the target countermeasure;
   wherein the countermeasure aiming aide is configured to display, based on the computed firing solution,
      a first symbol at a fixed point, the first symbol indicating a correct orientation of the weapon launcher to implement the fire control solution, and
      a second symbol positioned relative to the first symbol, the second symbol indicating a magnitude and a direction of a correction necessary to orient the weapon launcher to implement the computed fire control solution.

19. The weapon aiming system of claim 18, wherein the weapon launcher aiming aide further comprises a body-worn display system including at least one of a smart watch, night vision goggles or a weapon sight-individual display.

20. The weapon aiming system of claim 18, wherein data between the target sensor, the fire control computer, the weapon launcher, the target countermeasure, the weapon launcher inertial measurement unit is exchanged over a data exchange network enabled by one or more communication means including hardwire, wireless, radio frequency, electro-optical, infrared, and acoustic.

* * * * *